United States Patent
Lim et al.

(10) Patent No.: US 7,486,821 B2
(45) Date of Patent: Feb. 3, 2009

(54) METHOD FOR RECOGNIZING CHARACTERS IN A PORTABLE TERMINAL HAVING AN IMAGE INPUT UNIT

(75) Inventors: Chae-Whan Lim, Daegu (KR); Jeong-Wook Seo, Daegu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 624 days.

(21) Appl. No.: 10/859,987

(22) Filed: Jun. 4, 2004

(65) Prior Publication Data

US 2004/0252887 A1 Dec. 16, 2004

(30) Foreign Application Priority Data

Jun. 10, 2003 (KR) ...................... 10-2003-0037006

(51) Int. Cl.
*G06K 9/18* (2006.01)
*G06K 9/00* (2006.01)
(52) U.S. Cl. ...................... 382/182; 382/187
(58) Field of Classification Search ................ 381/112; 382/181, 182, 229, 309; 704/251
See application file for complete search history.

(56) References Cited

U.S. PATENT DOCUMENTS

| | | | | |
|---|---|---|---|---|
| 4,680,804 A | * | 7/1987 | Kuzunuki et al. | ........... 382/185 |
| 5,144,683 A | * | 9/1992 | Suzuki et al. | ............... 382/203 |
| 5,923,792 A | * | 7/1999 | Shyu et al. | .................. 382/309 |
| 5,995,919 A | * | 11/1999 | Chang et al. | .................... 704/8 |
| 6,091,546 A | * | 7/2000 | Spitzer | ....................... 359/618 |
| 7,190,833 B2 | * | 3/2007 | Kagehiro et al. | ............ 382/176 |
| 2002/0131636 A1 | | 9/2002 | Hou | ........................... 382/181 |
| 2003/0037008 A1 | * | 2/2003 | Raju et al. | ..................... 705/60 |
| 2003/0044068 A1 | | 3/2003 | Kagehiro et al. | ............ 382/182 |

FOREIGN PATENT DOCUMENTS

| | | |
|---|---|---|
| CN | 1407826 A | 4/2003 |
| EP | 0678822 | 10/1995 |
| JP | 07-225809 | 8/1995 |
| JP | 2001-005599 | 1/2001 |
| JP | 2001-160848 | 6/2001 |
| JP | 2001-202475 | 7/2001 |
| JP | 2001-273461 | 10/2001 |
| JP | 2002-252691 | 9/2002 |
| JP | 2002-269495 | 9/2002 |
| JP | 2003-078640 | 3/2003 |

* cited by examiner

*Primary Examiner*—Sherali Ishrat
(74) *Attorney, Agent, or Firm*—Roylance, Abrams, Berdo & Goodman, L.L.P.

(57) ABSTRACT

A method for automatically recognizing a photographed image in an automatic recognition mode in a mobile terminal are disclosed. The mobile terminal includes an image input unit capable of photographing the image and a memory capable of storing the image. The automatic recognition mode allows automatic recognition of characters. The method comprise setting the automatic recognition mode; and controlling the photographed image to be stored in the memory, the characters to be recognized from the photographed image, and the recognized characters to be stored, in the set automatic recognition mode.

4 Claims, 6 Drawing Sheets

METHOD FOR RECOGNIZING CHARACTERS IN A PORTABLE TERMINAL HAVING AN IMAGE INPUT UNIT

PRIORITY

This application claims the benefit under 35 U.S.C. § 119 (a) of an application entitled "Method for recognizing characters in portable terminal having image input unit" filed in the Korean Intellectual Property Office on Jun. 10, 2003 and assigned Serial No. 2003-37006, the entire contents of which are incorporated herein by reference.

BACKGROUND OF THE INVENTION

1. Field of the Invention

The present invention relates to a character recognition in a portable terminal. More particularly, the present invention relates to a method for recognizing characters and editing the recognized characters in a portable terminal.

2. Description of the Related Art

Portable terminals perform general communication functions and additional functions in addition to the communication functions. Among such additional functions are photographing of images through cameras incorporated into the portable terminals. The photographed images may be still images or moving images, and the portable terminals have the ability to store the photographed images.

However, if a camera of a conventional portable terminal photographs an image, such as a card or a book, and the like the portable terminal stores the whole photographed image but cannot recognize individual characters in the input image.

SUMMARY OF THE INVENTION

Accordingly, the present invention has been made to solve the above-mentioned problems occurring in the prior art. An object of the present invention is to provide a method capable of recognizing individual characters in an image input to a portable terminal.

Another object of the present invention is to provide a method for editing recognized characters in a portable terminal.

In order to accomplish the aforementioned objects, according to one aspect of the present invention, there is provided a method for automatically recognizing a photographed image when a mobile terminal is in an automatic recognition mode. The mobile terminal includes an image input unit capable of photographing the image and a memory capable of storing the image. The automatic recognition mode allows automatic recognition of characters. The method comprise setting the automatic recognition mode; and controlling the photographed image to be stored in the memory, the characters to be recognized from the photographed image, and the recognized characters to be stored, in the set automatic recognition mode.

In order to accomplish the aforementioned objects, according to one aspect of the present invention, there is provided a method for manually recognizing a photographed image in a manual recognition mode in a mobile terminal. The mobile terminal includes an image input unit capable of photographing the image and a memory capable of storing the image. The manual recognition mode allows characters to be designated and recognized. The method comprise setting the manual recognition mode; and controlling the photographed image to be stored in the memory, the characters to be recognized from the photographed image, and the recognized characters to be stored, in the set manual recognition mode.

In order to accomplish the aforementioned objects, according to one aspect of the present invention, there is provided a method for editing a recognized image in an editing mode in a mobile terminal. The mobile terminal includes an image input unit capable of photographing the image and a memory capable of storing the image, the editing mode allows recognized characters and the image stored in the memory to be edited. The method comprise displaying the image stored in the memory; selecting characters to be recognized; and controlling the selected characters and the image to be stored.

BRIEF DESCRIPTION OF THE DRAWINGS

The above and other objects, features and advantages of the present invention will be more apparent from the following detailed description taken in conjunction with the accompanying drawings, in which.

In the drawings, it should be noted that the same or similar elements are denoted by like reference numerals throughout the drawings.

DETAILED DESCRIPTION OF THE PREFERRED EMBODIMENTS

Embodiments of the present invention will be described with reference to the accompanying drawings. In the following description of embodiments of the present invention, a detailed description of known functions and configuration incorporated herein will be omitted for conciseness.

Figure 1:
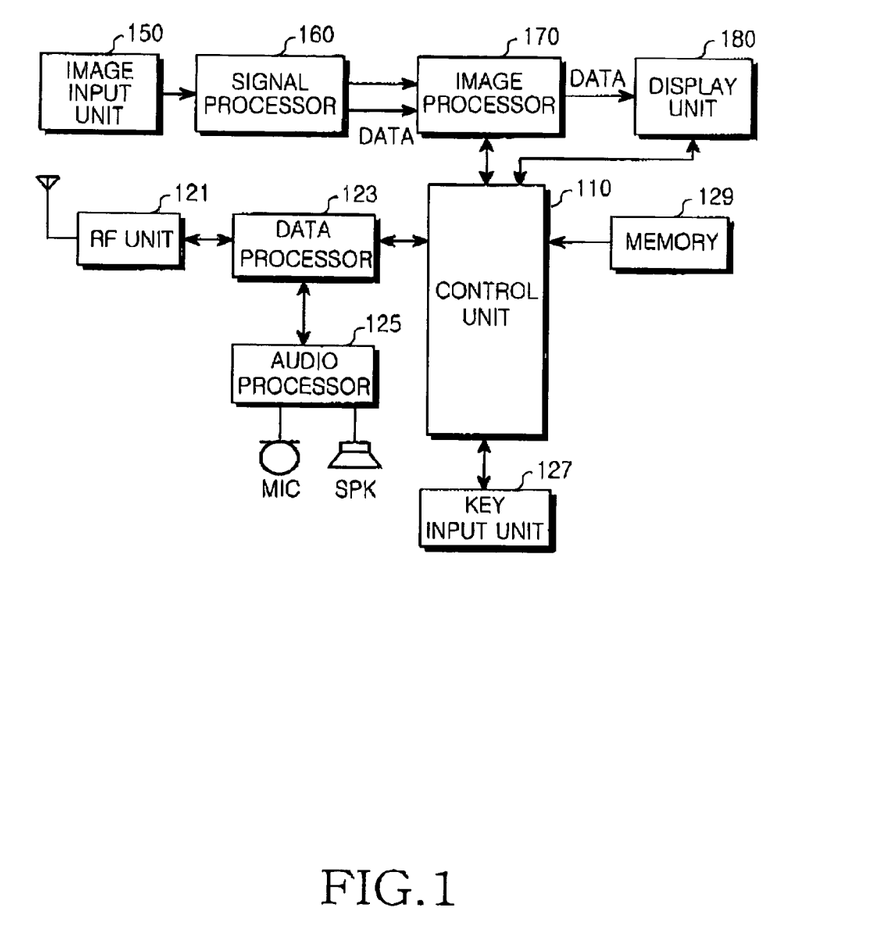
FIG. 1 is a block diagram showing an internal construction of a mobile terminal according to an embodiment of the present invention.

FIG. 1 is a block diagram showing a functional construction of a mobile terminal according to an embodiment of the present invention.

Referring to FIG. 1, a radio frequency (RF) unit 121 performs transmission and reception functions of the mobile terminal. The RF unit 121 includes an RF transmitter (not shown) for up-converting a frequency of a transmitted signal and amplifying the transmitted signal and an RF receiver (not shown) for low-noise amplifying a received signal and down-converting the frequency of the received signal. A data processor 123 includes a transmitter (not shown) for encoding and modulating the transmitted signal and a receiver (not shown) for demodulating and decoding the received signal. That is, the data processor 123 may include a modulator and demodulator (MODEM) and a coder and decoder (CODEC). An audio processor 125 reproduces a received audio signal output from the data processor 123 and provides it to a speaker (SPK) or transfers a transmitted audio signal output from a microphone (MIC) to the data processor 123.

A key input unit 127 includes various function keys for setting various functions and keys for inputting numbers and character information. The function keys represent a character recognition mode key, an automatic recognition mode key, a manual recognition mode key, an editing mode key, and so on. The function keys are set for selecting each mode, and may use a navigation key, a number key, a character key, and so on. Further, a combination of keys may also perform the role of the function key.

A memory 129 may include a program memory section (not shown) and a data memory section (not shown). The program memory section may store programs for controlling the general operation of the mobile terminal and programs for controlling the mobile terminal to operate according to a mode set in the character recognition mode according to an embodiment of the present invention. The data memory section temporarily stores data generated in the course of executing the programs or stores data input from an external device. Further, the data memory section stores pop-up characters in a list or photographed images. Herein, the memory 129 may store the photographed images and the list for storing the pop-up characters separately. A more detailed description of embodiments of the present invention will now be provided.

An image input unit 150 may include means of inputting images such as a camera, a camcoder, or a scanner. Further, the image input unit 150 photographs an image and includes a camera sensor (not shown) for converting a photographed optical signal into an electrical signal. Herein, it is assumed that the camera sensor is a charge-coupled device (CCD) sensor. Further, it is assumed that the image input unit 150 is internal to the mobile terminal in an embodiment of the present invention, but an external-type image input unit 150 connected to the mobile terminal may be employed. It should be appreciated by those skilled in the art that image input unit 150 may be either attachable or integrated into the mobile terminal.

A signal processor 160 converts the image input from the image input unit 150 to an image signal. Herein, the signal processor 160 may be achieved by a digital signal processor (DSP). An image processor 170 generates image data for displaying the image signal output from the signal processor 160. Further, the image processor 170 transmits the image signal received under the control of a control unit 110 corresponding to the size format and standard of a display unit 180, and compresses and decompresses the image data.

The control unit 110 controls the general operation of the mobile terminal and may include the data processor 123. Further, the control unit 110 receives the key signal of the key input unit 127, controls the mode of the mobile terminal to be switched to an automatic recognition mode, a manual recognition mode, or an editing mode, and controls the operation of the mobile terminal according to established modes.

The display unit 180 may employ a Liquid Crystal Display (LCD), and the like. The display unit 180 may include a LCD controller, a memory for storing image data, and a LCD display device, and so on. Further, the display unit 180 receives the image signal transmitted from the image processor 170 and displays the image signal on a screen. Further, the control unit 110 controls a box and a line to be displayed on the display unit 180 according to a key input of a user. Herein, the user may adjust the size of the box or the length of the line. For instance, the box may have various sizes or the line may have various lengths, allowing the user to select the size of the box or the length of the line. Further, the size of the box or the length of the line may be adjusted by an operation of a predetermined key such as a navigation key, a number key, or a special key designated to achieve that purpose.

Figure 2:
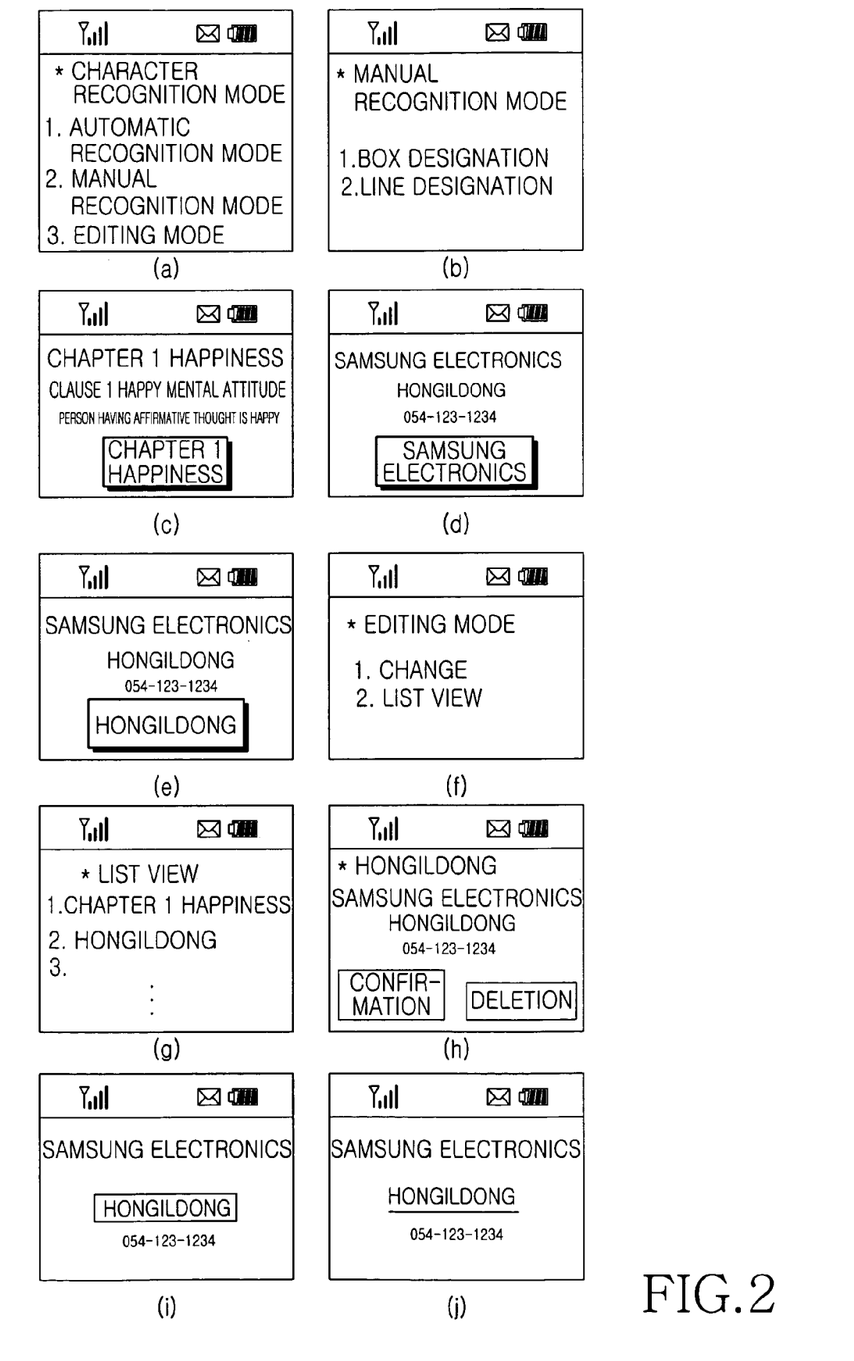
FIG. 2 is a diagram illustrating various information displayed on a display unit of a mobile terminal according to an embodiment of the present invention.
Figure 3:
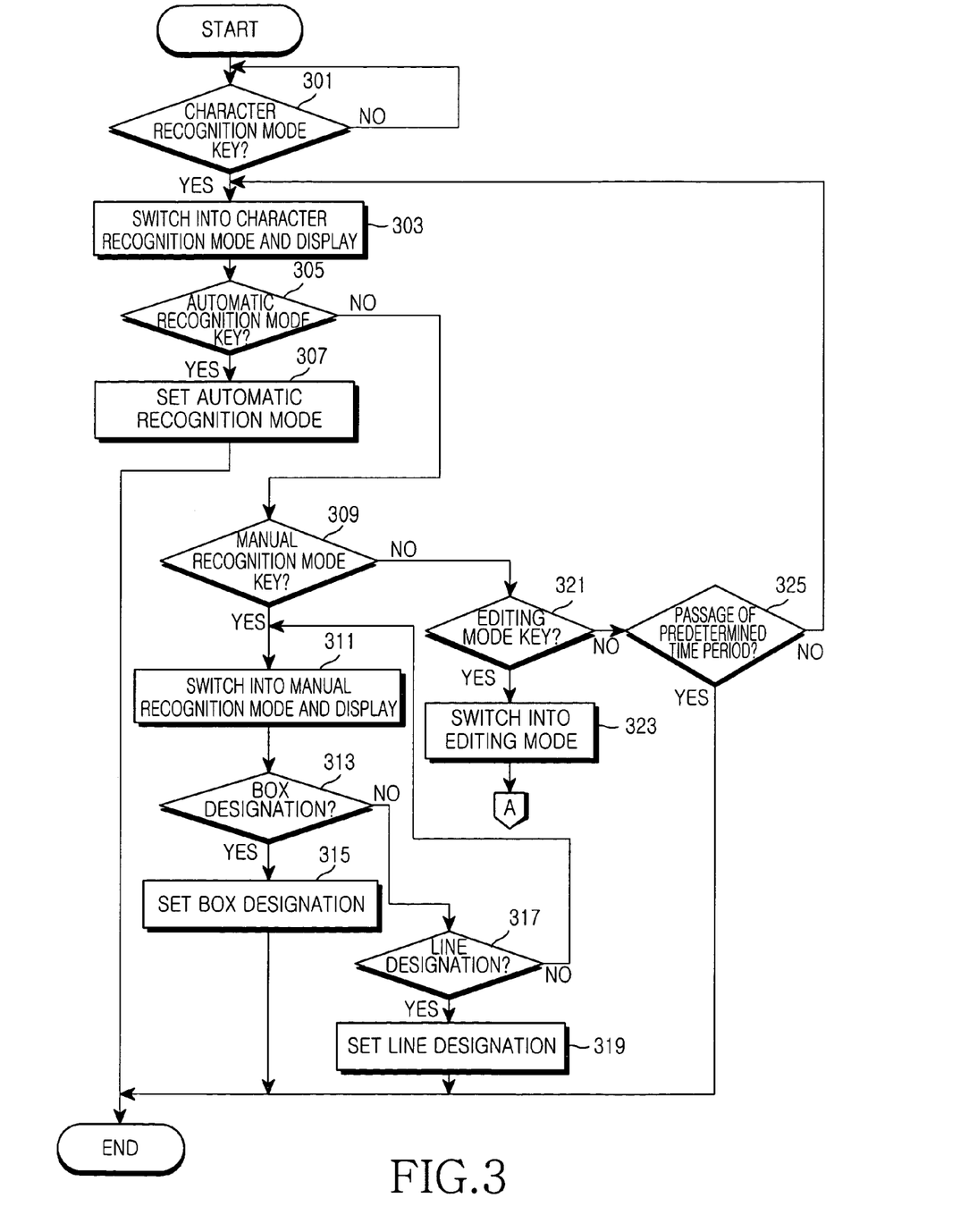
FIG. 3 is a flowchart illustrating a method for setting a character recognition mode in a mobile terminal according to an embodiment of the present invention.

FIG. 2 is a diagram illustrating various information displayed on a display unit of a mobile terminal according to an embodiment of the present invention. FIG. 3 is a flowchart illustrating a method for setting a character recognition mode in a mobile terminal according to an embodiment of the present invention. Hereinafter, a method for setting an automatic recognition mode and a manual recognition mode in a character recognition mode will now be described with reference to FIGS. 1 to 3.

First, in step 301, the control unit 110 determines whether a key signal is input from the key input unit 127. As a result of the determination, if the key signal is not a character recognition mode key signal, an initial state of the mobile terminal is maintained. In contrast, if the key signal is the character recognition mode key signal, step 303 is performed. Herein, the character recognition mode key signal comprises a signal generated when a user presses a key of the key input unit 127, and the key input unit 127 may include a separate character recognition mode key.

In step 303, the control unit 110 switches the mode of the mobile terminal to the character recognition mode, and displays information of the character recognition mode on the display unit 180. Step 305 is then performed. The display unit 180 may display the information related to the character recognition mode, such as the information shown in FIG. 2a. Herein, the mode of the mobile terminal may be switched to the character recognition mode either by pressing the character recognition mode key, or by pressing number keys, special keys, navigation keys, or a combination of these keys.

In step 305, the control unit 110 determines whether a key signal is input from the key input unit 127. From the result of the determination, if key signal is not an automatic recognition mode key signal, step 309 is performed. In contrast, if key signal is the automatic recognition mode key signal, step 307 is performed. In step 307, the control unit 110 sets the automatic recognition mode in the mobile terminal. Herein, the automatic recognition mode is a mode allowing automatic recognition of an image input from the image input unit 150, and this will described in detail in connection with FIG. 4.

In step 309, the control unit 110 determines whether a key signal is input from the key input unit 127. As a result of the determination, if key signal is not a manual recognition mode key signal, step 321 is performed. In contrast, if key signal is the manual recognition mode key signal, step 311 is performed. In step 311, the control unit 110 switches the mode of the mobile terminal to the manual recognition mode, and displays information of the manual recognition mode on the display unit 180. Step 313 is then performed. The display unit 180 may display the information of the manual recognition mode as illustrated in FIG. 2b.

In step 313, the control unit 110 determines whether a box designation is selected. As a result of the determination, if box designation is not selected, step 317 is performed. In contrast, if box designation is selected, step 315 is performed. In step 315, the control unit 110 sets the box designation in the mobile terminal. Herein, the box designation refers to "drawing a box around characters to be recognized through the setting of an environment". Accordingly, the user can draw a box around desired characters and recognize the characters in the manual recognition mode.

In step 317, the control unit 110 determines whether a line designation is selected. As a result of the determination, if the line designation is not selected, step 311 is repeated. In contrast, if the line designation is selected, step 319 is performed. In step 319, the control unit 110 sets the line designation in the mobile terminal. Herein, the line designation refers to "setting of an environment in order to draw a line under characters to be recognized and to recognize the characters through setting of an environment". Accordingly, the user can draw a line under desired characters and recognize the characters in the manual recognition mode. When the user sets the box designation or the line designation in the manual recognition mode, the control unit 110 prevents the automatic recognition mode from being set. In contrast, if the user sets the automatic recognition mode, the control unit 110 prevents the manual recognition mode from being set.

In step 321, the control unit 110 determines whether a key signal is input from the key input unit 127. As a result of the determination, if the key signal is not an editing mode key signal, step 325 is performed. In contrast, if the key signal is the editing mode key signal, step 323 is performed. In step 323, the control unit 110 switches the mode of the mobile terminal to the editing mode. Herein, the editing mode is a mode for editing the images stored in the memory 129, and this will described in detail in connection with FIG. 6.

In step 325, the control unit 110 determines whether a predetermined time period, for instance, one minute, has elapsed. As a result of the determination, if one minute has not elapsed, step 303 is repeated. In contrast, if one minute has elapsed, the procedure ends. Herein, the predetermined time period is a time set in advance, and the procedure ends if the automatic recognition mode key signal, the manual recognition mode key signal, or the editing mode key signal is not input for the predetermined time period.

Figure 4:
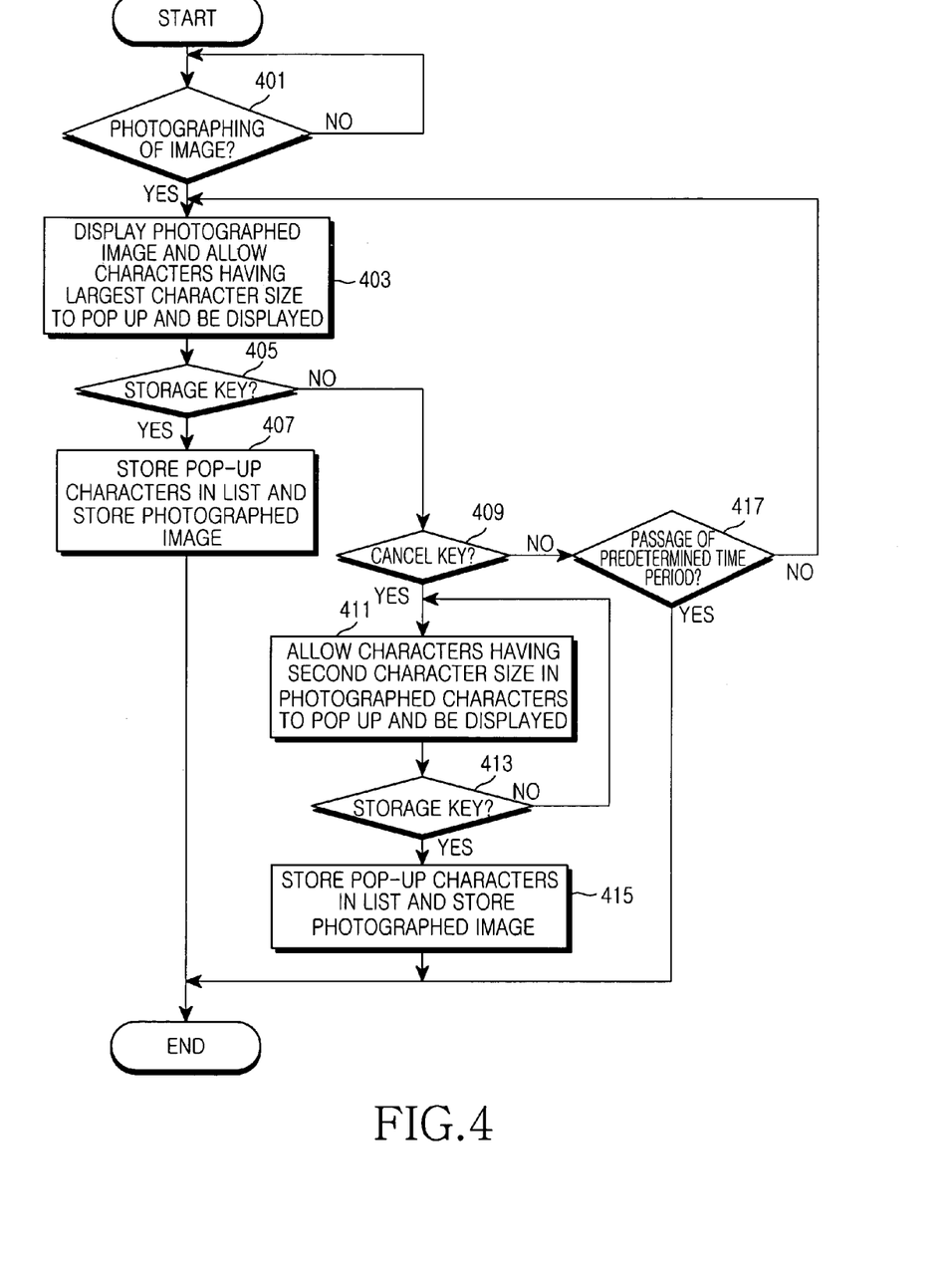
FIG. 4 is a flowchart illustrating an operation of an automatic recognition mode set in a character recognition mode according to an embodiment of the present invention.

FIG. 4 is a flowchart illustrating an operation of an automatic recognition mode set in a character recognition mode according to an embodiment of the present invention. Hereinafter, a method by which the control unit 110 recognizes characters if the automatic recognition mode has been set in the character recognition mode will be described with reference to FIGS. 1, 2, and 4. If the user takes a photograph of an image using the mobile terminal, step 401 is performed.

In step 401, the control unit 110 determines whether the image is photographed. As a result of the determination, if the image has not been photographed, an initial state of the mobile terminal is maintained. In contrast, if the image has been photographed, step 403 is performed. In step 403, the control unit 110 displays the photographed image on the display unit 180, and causes characters having the largest character size to pop up (here, "to pop up" refers to "emergence of data located at the highest position from stored data") and be displayed.

In order to recognize characters, the control unit 110 differentiates black character regions from white background regions. In differentiating the regions, the control unit 110 may further thicken the black character regions and further lighten the white background regions. Further, the control unit 110 recognizes the differentiated black character regions as character regions and converts the character regions to code values. The memory 129 stores the code values. In the image displayed on the display unit 180, the control unit 110 may determine the character size on the basis of the number of dots of the LCD. The control unit 110 controls characters having the largest character size from among the determined character sizes to be displayed on the display unit 180. The display unit 180 may display the characters as shown in FIGS. 2c and 2d. FIG. 2c shows an image obtained by photographing a portion of a book, and the control unit 110 controls "chapter 1 happiness" having the largest character size to pop up and be displayed on the display unit 180. FIG. 2d shows an image obtained by photographing a business card, and the control unit 110 controls "Samsung Electronics" having the largest character size to pop up and be displayed on the display unit 180.

Next, in a method for recognizing characters, there may also exist a method for automatically recognizing and storing characteristic characters. That is, characters which can be commonly recognized are stored in a database, the characters stored in the database are compared with recognized characters, and the recognized characters may be popped up and displayed if the stored characters match the recognized characters. For instance, a business card includes a telephone number field such as TEL, Tel, Phone, telephone number, telephone, or T, a mobile phone field such as C.P., CP, C.P, HHP, H.P, Mobile, MOBILE, or mobile phone, and an email field such as E-mail, Email, or e-mail. Herein, the characteristic characters are characters which can be commonly applied, and may be a telephone number identifier or "-" (e.g., 02-000-1111) in addition to the telephone number field, the mobile phone field, and the email field. Further, the characteristic characters may be stored in the database, and the control unit 110 may compare the recognized characters with the characters stored in the database on the basis of the characteristic characters, and control the recognized characters to pop up and be displayed on the display unit 180 if the recognized characters match the stored characters. For instance, if a character row "054-123-1234" has popped up and been displayed as shown in FIG. 2d, it may be determined that the characteristic character "-" has been stored in a database. That is, since the characteristic character "-" exists in FIG. 2d, the control unit 110 controls the display unit 180 to display the pop-up character row "054-123-1234" including the character "-".

In step 405, the control unit 110 determines whether a key signal is input from the key input unit 127. As a result of the determination, if the key signal is not a storage key signal, step 409 is performed. In contrast, if the key signal is the storage key signal, step 407 is performed. Herein, the storage key signal is a signal generated if a user presses a storage key of the key input unit 127. The storage key may be contained in the key input unit 127 as one key, or a key based on a selective combination of navigation keys or confirmation keys. In step 407, the control unit 110 controls pop-up characters (e.g., "chapter 1 happiness" or "Samsung Electronics") to be stored in the list, and controls the photographed images to be stored in the memory 129. Herein, the list may be stored in the memory 129, or may be stored in a different memory. In a method for storing the pop-up characters, the memory 129 may store a table of contents created from a set having a large character row. For instance, if a book or a document is recognized, the control unit 110 controls large characters, such as a title or a subtitle, to pop up and be displayed on the display unit 180. Further, the control unit 110 may control the memory 129 to store the pop-up characters in the form of a table of contents. Herein, the table of contents may be classified into types of books or documents, or contents having one category.

In step 409, the control unit 110 determines whether a key signal is input from the key input unit 127. As a result of the determination, if the key signal is not a cancel key signal, step 417 is performed. In contrast, if the key signal is the cancel key signal, step 411 is performed. Herein, the cancel key signal is a signal generated if a user presses a cancel key of the key input unit 127. The cancel key may be contained in the key input unit 127 as one key, or a key based on a selective combination of navigation keys or confirmation keys.

In step 411, the control unit 110 displays characters having a second character size from among the photographed characters to be displayed on the display unit 180. Step 413 is then performed. In the image displayed on the display unit 180, the control unit 110 may determine the character size on the basis of the number of dots of the LCD. Further, the control unit 110 controls the characters having the second character size from among the determined character characters to pop up and be displayed on the display unit 180. The display unit 180 may pop-up and display the characters "hongildong" having the second character size as illustrated in FIG. 2e. That is, whenever the user presses the cancel key of the key input unit 127, the control unit 110 controls the display unit 180 to sequentially display the pop-up characters in order of size, for example, from characters having a large character size to characters having a small character size. Next, if characters having the smallest character size in the photographed images pop up and are displayed on the display unit 180 and the user presses the cancel key, step 403 is repeated.

In step 413, the control unit 110 determines whether a key signal is input from the key input unit 127. As a result of the determination, if the key signal is not the storage key signal, step 411 is repeated. In contrast, if the key signal is the storage key signal, step 415 is performed. If the storage key signal is not input for the predetermined time period (such as one minute), the procedure ends. In step 415, the control unit 110 controls the pop-up characters to be stored in the list and the photographed images to be stored in the memory 129.

In step 417, the control unit 110 determines whether a predetermined time period, for instance, one minute, has elapsed. As a result of the determination, if one minute has not elapsed, step 403 is repeated. In contrast, if one minute has elapsed, the procedure ends. Herein, the predetermined time period is a time set in advance, and the procedure ends when the storage key signal or the cancel key signal is not input for the predetermined time period.

Figure 5:
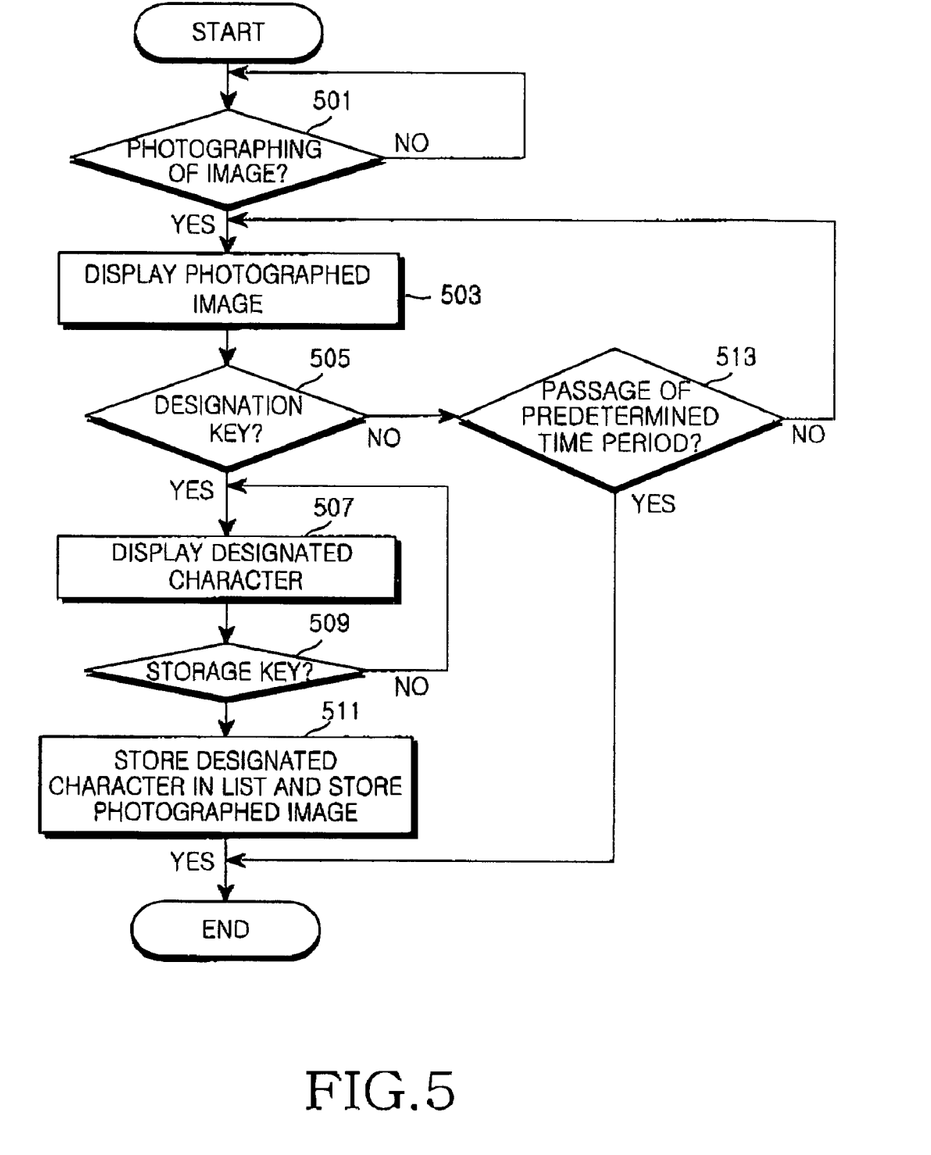
FIG. 5 is a flowchart illustrating an operation of a manual recognition mode set in a character recognition mode according to an embodiment of the present invention.

FIG. 5 is a flowchart illustrating an operation of a manual recognition mode set in a character recognition mode according to an embodiment of the present invention. Hereinafter, a method by which the control unit 110 recognizes characters when the manual recognition mode has been set in the character recognition mode will be described with reference to FIGS. 1, 2, and 5. If the user photographs an image using the mobile terminal, step 501 is performed.

In step 501, the control unit 110 determines whether the image is photographed. As a result of the determination, if the image has not been photographed, an initial state of the mobile terminal is maintained. In contrast, if the image has been photographed, step 503 is performed. In step 503, the control unit 110 displays the photographed image on the display unit 180. Step 505 is then performed. Herein, the display unit 180 may display the image as shown in FIGS. 2i and 2j. FIG. 2i displays the image by assuming a box designation in the character recognition mode, and FIG. 2j displays the image by assuming a line designation in the character recognition mode.

In step 505, the control unit 110 determines whether a key signal is input from the key input unit 127. As a result of the determination, if the key signal is not a designated key signal, step 513 is performed. In contrast, if the key signal is the designated key signal, step 507 is performed. In step 507, the control unit 110 controls designated characters to be displayed on the display unit 180. Step 509 is then performed. That is, if the user selects characters to be recognized using the designated key of the key input unit 127, the control unit 110 controls the designated characters to be displayed on the display unit 180. Herein, the designated key may be contained in the key input unit 127 as one key, or the user may select characters to be recognized based on a combination of navigation keys, confirmation keys, or number keys. That is, if it is assumed that the photographed image is a business card and the box designation has been set in the character recognition mode, the user designates the characters (such as "hongildong") to be recognized using the designated key so that the characters are located in the box. Similarly, if it is assumed that the photographed image is a business card and the line designation has been set in the character recognition mode, the user designates the characters (such as "hongildong") to be recognized using the designated key so that the characters are located on the line. Herein, the size of the box and the length of the line can be adjusted as described above.

In step 509, the control unit 110 determines whether a key signal is input from the key input unit 127. As a result of the determination, if the key signal is not a storage key signal, step 507 is repeated. In contrast, if the key signal is the storage key signal, step 511 is performed. Herein, the storage key signal is a signal generated if the user presses the storage key of the key input unit 127. The storage key may be contained in the key input unit 127 as one key, or a key based on a selective combination of navigation keys or confirmation keys. In step 511, the control unit 110 recognizes the designated characters, stores the recognized characters in the list, and controls the photographed image to be stored in the memory 129.

In step 513, the control unit 110 determines whether a predetermined time period, for instance, one minute, has elapsed. As a result of the determination, if one minute has not elapsed, step 503 is repeated. In contrast, if one minute has elapsed, the procedure ends. Herein, the predetermined time period is a time set in advance, and the procedure ends if the designated key signal is not input for the predetermined time period.

Figure 6:
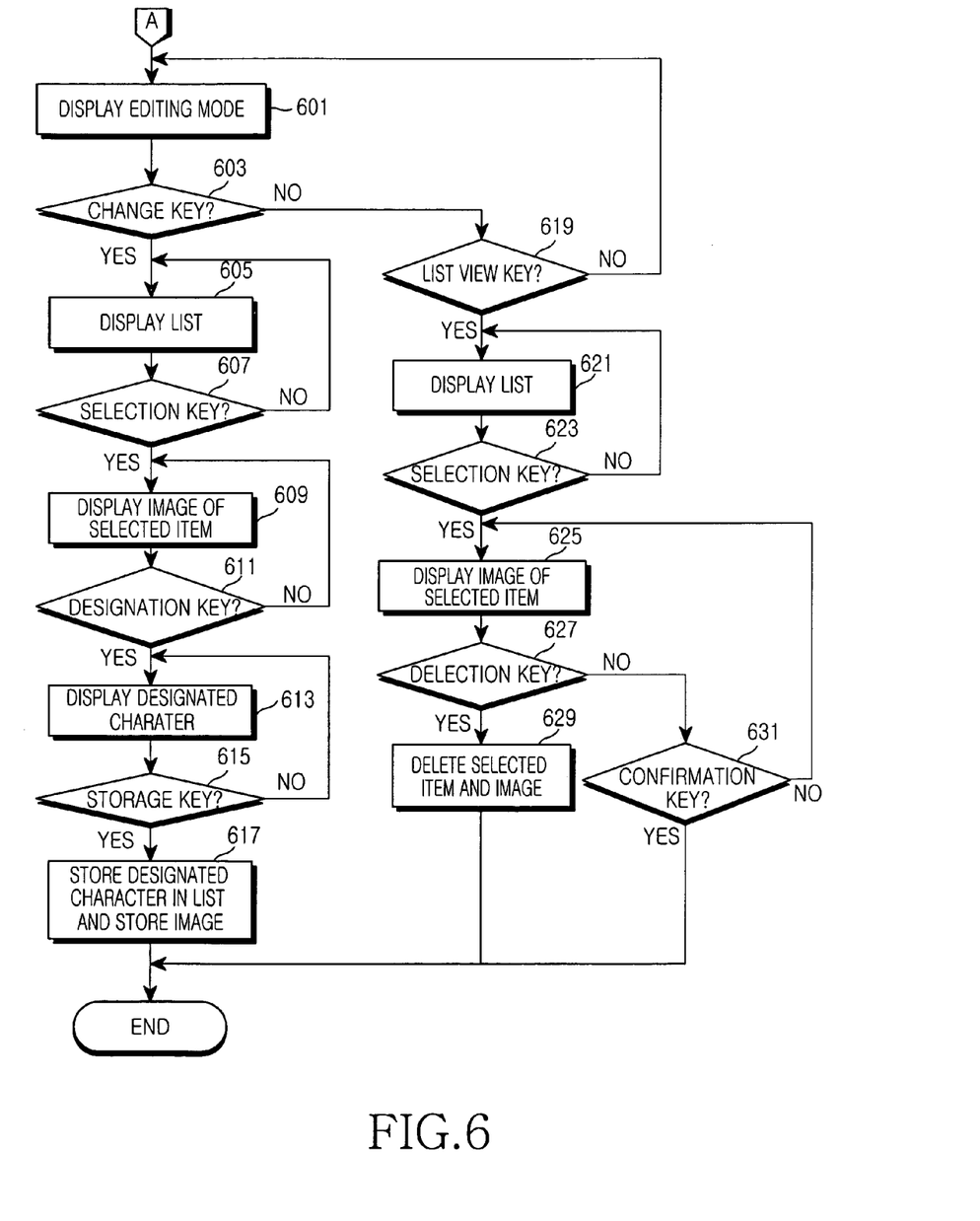
FIG. 6 is a flowchart illustrating an operation of an editing mode in a character recognition mode according to an embodiment of the present invention.

FIG. 6 is a flowchart illustrating an operation of an editing mode in a character recognition mode according to an embodiment of the present invention. Hereinafter, an operation of the control unit in the editing mode will be described with reference to FIGS. 1, 2, and 6.

First, if the user selects the editing mode, step 601 is performed. That is, in step 601, the control unit 110 controls information of the editing mode to be displayed on the display unit 180. Step 603 is then performed. The display unit 180 may display the information of the editing mode as shown in FIG. 2f.

In step 603, the control unit 110 determines whether a key signal is input from the key input unit 127. As a result of the determination, if the key signal is not a change key signal, step 619 is performed. In contrast, if the key signal is the change key signal, step 605 is performed. In step 605, the control unit 110 controls the list to be displayed on the display unit 180. Step 607 is then performed. The display unit 180 may display the list as shown in FIG. 2g.

In step 607, the control unit 110 determines whether a key signal is input from the key input unit 127. As a result of the determination, if the key signal is not a selection key signal, step 605 is repeated. In contrast, if the key signal is the selection key signal, step 609 is performed. Herein, the selection key signal is a signal generated if a user presses the selection key of the key input unit 127, and the selection key refers to a navigation key, a confirmation key, or a number key capable of selecting an item from the list. In step 609, the control unit 110 controls an image of the selected list to be displayed on the display unit 180. Step 611 is then performed. The display unit 180 may display the image of the selected list as shown in FIG. 2i or 2j.

In step 611, the control unit 110 determines whether a key signal is input from the key input unit 127. As a result of the determination, if the key signal is not a designated key signal, step 609 is repeated. In contrast, if the key signal is the designated key signal, step 613 is performed. In step 613, the control unit 110 controls designated characters to be displayed on the display unit 180. Step 615 is then performed. That is, if the user selects characters to be recognized using the designated key of the key input unit 127, the control unit 110 controls the designated characters to be displayed on the display unit 180. Herein, the designated key may be contained in the key input unit 127 as one key, or the user may select characters to be recognized based on a combination of navigation keys, confirmation keys, or number keys. That is, if it is assumed that the photographed image is a business card and a box designation has been set in the character recognition mode, the user designates the characters (such as "hongildong") to be recognized using the designated key so that the characters are located in the box. Similarly, if it is assumed that the photographed image is a business card and a line designation has been set in the character recognition mode, the user designates the characters (such as "hongildong") to be recognized using the designated key so that the characters are located on the line. Herein, the size of the box and the length of the line can be adjusted as described above.

In step 615, the control unit 110 determines whether a key signal is input from the key input unit 127. As a result of the determination, if the key signal is not a storage key signal, step 613 is repeated. In contrast, if the key signal is the storage key signal, step 617 is performed. Herein, the storage key signal is a signal generated if the user presses the storage key of the key input unit 127. The storage key may be contained in the key input unit 127 as one key, or a key based on a selective combination of navigation keys or confirmation keys. In step 617, the control unit 110 recognizes the designated characters, stores the recognized characters in the list, and controls the image (the whole business card) to be stored in the memory 129.

In step 619, the control unit 110 determines whether a key signal is input from the key input unit 127. As a result of the determination, if the key signal is not a list view key signal, step 601 is repeated. In contrast, if the key signal is the list view key signal, step 621 is performed. In step 621, the control unit 110 controls the list to be displayed on the display unit 180. Step 623 is then performed. The display unit 180 may display the list as shown in FIG. 2g.

In step 623, the control unit 110 determines whether a key signal is input from the key input unit 127. As a result of the determination, if the key signal is not the selection key signal, step 621 is repeated. In contrast, if the key signal is the selection key signal, step 625 is performed. Herein, the selection key signal is the signal generated when the user presses the selection key of the key input unit 127, and the selection key refers to the navigation key, the confirmation key, or the number key capable of selecting an item from the list. In step 625, the control unit 110 controls the image of the selected list to be displayed on the display unit 180. Step 627 is then performed. The display unit 180 may display the image of the selected list as shown in FIG. 2h. That is, if the user selects an item entitled "2. hongildong", the control unit 110 controls an image, which has been stored with a title of "2. hongildong" in the memory 129, to be displayed on the display unit 180.

In step 627, the control unit 110 determines whether a key signal is input from the key input unit 127. As a result of the determination, if the key signal is not a deletion key signal, step 631 is repeated. In contrast, if the key signal is the deletion key signal, step 629 is performed. In step 629, the control unit 110 controls the selected item ("hongildong") and the image (card) to be deleted from the memory 129.

In step 631, the control unit 110 determines whether a key signal is input from the key input unit 127. As a result of the determination, if the key signal is not a confirmation key signal, step 625 is repeated. In contrast, if the key signal is the confirmation key signal, the procedure is ended. Herein, the confirmation key signal is a signal generated if the user presses the confirmation key of the key input unit 127, and the confirmation key is used if the user performs a confirmation and an end.

If the user calls, the recognized characters can be used. That is, if it is assumed that the user has set the box designation in the manual recognition mode of the character recognition mode, the control unit 110 can separately recognize a name and a phone number in the photographed image (such as a business card) by means of the box and store the recognized name and phone number. In a method for separately recognizing and storing the name and the phone number, the control unit 110 differentiates black character (such as name or phone number, and so on) regions from white background regions. In differentiating the regions, the control unit 110 may further thicken the black character regions and lighten the white background regions. Further, the control unit 110 recognizes the differentiated black character regions as character areas and converts the character areas to code values. The memory 129 stores the code value. That is, the memory 129 stores the code values of the characters (such as name or phone number). Accordingly, if the user searches for the name and the phone number stored in the memory 129, the control unit 110 controls the name and the phone number to be displayed on the display unit 180. Herein, if the user presses a communication (send) key, the control unit 110 dials the phone number displayed on the display unit 180.

According to an embodiment of the present invention as described above, characters are recognized from an image (such as business card or book) input from an image input unit of a mobile terminal and the recognized characters are stored in the mobile terminal as a list, so that a user can search for and edit desired characters from the stored list. In addition, the user can dial a phone number in the list.

While the invention has been shown and described with reference to certain embodiments thereof, it should be understood by those skilled in the art that various changes in form and details may be made therein without departing from the spirit and scope of the invention as defined by the appended claims.

What is claimed is:

1. A method for recognizing an image in a mobile terminal, the mobile terminal including an image input unit capable of photographing the image and a memory capable of storing the image, the method comprising the steps of:

setting an automatic recognition mode in the mobile terminal when an automatic recognition mode key is input in a character recognition mode, the automatic recognition mode generating a first character based on a first portion of the image having a first size and generating a second character based on a second portion of the image having a second size, the first size being different from the second size; and selectively displaying the first and second characters over the image on the mobile terminal based on the first and second sizes and an input from a user.

2. The method as claimed in claim 1, further comprising storing the first character in a first memory location, storing the second character in a second memory location, and storing the third character in a third memory location.

3. The method as claimed in claim 1, wherein generating the first character comprises determining if the first portion of the image is substantially similar to a character stored in a character database.

4. The method as claimed in claim 1, further comprising:

setting an editing mode when an editing mode key is input in the character recognition mode;

selecting a first portion of the image having a first size;

generating a first character substantially equal to the first portion of the image, the first character being machine readable; and storing the first character in a first memory location and storing the image in a second memory location.

* * * * *